US009362732B2

(12) United States Patent
Okuhara

(10) Patent No.: US 9,362,732 B2
(45) Date of Patent: Jun. 7, 2016

(54) CORRUGATED TUBE WITH PATH-MAINTAINING MEMBER AND WIRE HARNESS

(75) Inventor: Takashi Okuhara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 270 days.

(21) Appl. No.: 14/117,224

(22) PCT Filed: Oct. 14, 2011

(86) PCT No.: PCT/JP2011/073680
§ 371 (c)(1),
(2), (4) Date: Nov. 12, 2013

(87) PCT Pub. No.: WO2013/001664
PCT Pub. Date: Jan. 3, 2013

(65) Prior Publication Data
US 2014/0231135 A1    Aug. 21, 2014

(30) Foreign Application Priority Data

Jun. 28, 2011   (JP) .................................. 2011-142705

(51) Int. Cl.
*H02G 5/06* (2006.01)
*H02G 3/04* (2006.01)
*B60R 16/02* (2006.01)

(52) U.S. Cl.
CPC ............ *H02G 5/066* (2013.01); *B60R 16/0215* (2013.01); *H02G 3/0468* (2013.01)

(58) Field of Classification Search
CPC ............................ H02G 5/066; H02G 3/0468
USPC ..................... 174/99 R, 70 C, 72 A
See application file for complete search history.

(56) References Cited

U.S. PATENT DOCUMENTS

| 5,367,126 A * | 11/1994 | Kikuchi | ............... H01B 7/0045 174/135 |
| 8,227,694 B2 * | 7/2012 | Murayama | .......... B60R 16/0207 174/101 |
| 8,530,743 B2 * | 9/2013 | Mori | .................... B60R 16/0215 174/72 A |

FOREIGN PATENT DOCUMENTS

| JP | 4-86022 | 7/1992 |
| JP | 5-10110 | 2/1993 |
| JP | 2000-184551 | 6/2000 |
| JP | 2002-064917 | 2/2002 |
| JP | 2006-296166 | 10/2006 |
| JP | 2006-320181 | 11/2006 |

OTHER PUBLICATIONS

International Search Report, mail date is Nov. 8, 2011.

* cited by examiner

*Primary Examiner* — William H Mayo, III
*Assistant Examiner* — Hiram E Gonzalez
(74) *Attorney, Agent, or Firm* — Greenblum & Bernstein, P.L.C.

(57) ABSTRACT

A corrugated tube with a path-maintaining member is provided with a corrugated tube having annular convex portions and annular concave portions alternately formed along a longitudinal direction, and a path-maintaining member attached to the corrugated tube along the longitudinal direction thereof. The path-maintaining member is formed as a long member die-molded to maintain a shape at least a portion of which is bent in the longitudinal direction and includes an arc-shaped portion in which a lateral-direction cross section exhibits an arc shape.

4 Claims, 3 Drawing Sheets

CORRUGATED TUBE WITH PATH-MAINTAINING MEMBER AND WIRE HARNESS

TECHNICAL FIELD

The present invention relates to a technology keeping a path of an electric wire constant while covering the electric wire.

TECHNICAL BACKGROUND

Conventionally, as disclosed in Patent Documents 1-4, a technology is known in which a wire harness installed in a vehicle and the like is covered by a corrugated tube with good flexibility.

RELATED ART

Patent Literature

Patent Document 1: Japanese Utility Model Laid-Open Publication No. 1-14-86022
Patent Document 2: Japanese Patent Laid-Open Publication No. 2000-184551
Patent Document 3: Japanese Patent Laid-Open Publication No. 2002-64917
Patent Document 4: Japanese Patent Laid-Open Publication No. 2006-296166

SUMMARY OF THE INVENTION

Problems to Be Solved by the Invention

However, because the corrugated tube itself has superior flexibility, a path of the wire harness cannot be kept constant. Therefore, it is necessary to keep the path of the wire harness constant by fixing clamping members that are attached to the wire harness or the corrugated tube to certain positions in the vehicle. When the number of places where the clamping members are fixed increases, there is a risk of causing an increase in parts cost, an increase in installation cost, and the like.

Means for Solving the Problems

Here, by using a gutter-shaped resin molded product (protector) formed into a three-dimensional shape conforming with an installation location of the wire harness, the path of the wire harness can be kept constant while the wire harness is protected.

However, in order to form the resin molded product capable of protecting the wire harness into a three-dimensional shape conforming with the installation location of the wire harness, a mold shape of the resin molded product becomes complicated. Therefore, manufacturing cost increases.

Therefore, a configuration is proposed by the present inventor in which a path-maintaining member is attached to a corrugated tube, the path-maintaining member being die-molded to maintain a shape at least a portion of which is bent along a longitudinal direction, and the corrugated tube and a wire harness inside the corrugated tube are maintained in a predetermined bent shape. As a configuration for attaching the path-maintaining member to the corrugated tube, a configuration is proposed in which a pair of concave grooves are formed on the path-maintaining member and edge portions on both sides of a slit of the corrugated tube are fitted into the pair of concave grooves.

However, the above path-maintaining member is configured to have a portion covering an outer periphery side of the corrugated tube and thus it is necessary to configure the path-maintaining member to have a size equal to or larger than an outer diameter of the corrugated tube. Therefore, an overall shape of the path-maintaining member becomes large, which becomes a cost-increasing factor and the like.

Therefore, a purpose of the present invention is to enable, with a more compact configuration, a path of an electric wire to be kept constant while covering the electric wire.

Effect of the Invention

To achieve the above purpose, a first aspect is provided with a corrugated tube that has annular convex portions and annular concave portions alternately formed along a longitudinal direction; and a path-maintaining member that is formed as a long member die-molded to maintain a shape at least a portion of which is bent along the longitudinal direction, that includes an arc-shaped portion in which a lateral-direction cross section exhibits an arc shape, and that is attached to the corrugated tube along the longitudinal direction in a state where the arc-shaped portion is arranged on an inner periphery side of the corrugated tube. The path-maintaining member includes a first portion and a second portion that have different dimensions in a width direction of the arc-shaped portion, and the first portion having a long dimension in the width direction of the arc-shaped portion is more sharply bent than the second portion having a short dimension in the width direction of the arc-shaped portion.

A second aspect is the corrugated tube with the path-maintaining member according to the first aspect, in which the path-maintaining member includes, on at least a portion of the arc-shaped portion in the longitudinal direction, a protruding portion provided in a protruding manner in a width-direction middle portion on an outer periphery side of the arc-shaped portion, and the protruding portion is arranged in a slit formed in the corrugated tube.

A wire harness according to a fourth aspect includes the corrugated tube with the path-maintaining member according to the first or second aspects; and a wire harness main body having at least one electric wire and inserted into the corrugated tube with the path-maintaining member.

According to the corrugated tube with the path-maintaining member of the first aspect, the path-maintaining member is attached to the corrugated tube along the longitudinal direction thereof in the state where the arc-shaped portion in which the lateral-direction cross section exhibits an arc shape is arranged on the inner periphery side of the corrugated tube. Therefore, it is possible, with a more compact configuration, to keep the path of the electric wire constant while covering the electric wire.

According to the second aspect, by arranging the protruding portion in the slit, the arc-shaped portion of the path-maintaining member can be positioned to be arranged on the inner side of the slit.

According to the first aspect, the bent shape can be more reliably maintained by the first portion having a long dimension in the width direction of the arc-shaped portion. Further, by making the dimension of the second portion short in the width direction of the arc-shaped portion, the path-maintaining member can be easily formed.

According to the wire harness of the fourth aspect, the path-maintaining member is attached to the corrugated tube along the longitudinal direction thereof in the state where the arc-shaped portion in which the lateral-direction cross section exhibits an arc shape is arranged on the inner periphery side of the corrugated tube. Therefore, it is possible, with a more compact configuration, to keep the path of the electric wire constant while covering the electric wire.

MODE FOR CARRYING OUT THE INVENTION

Figure 1:
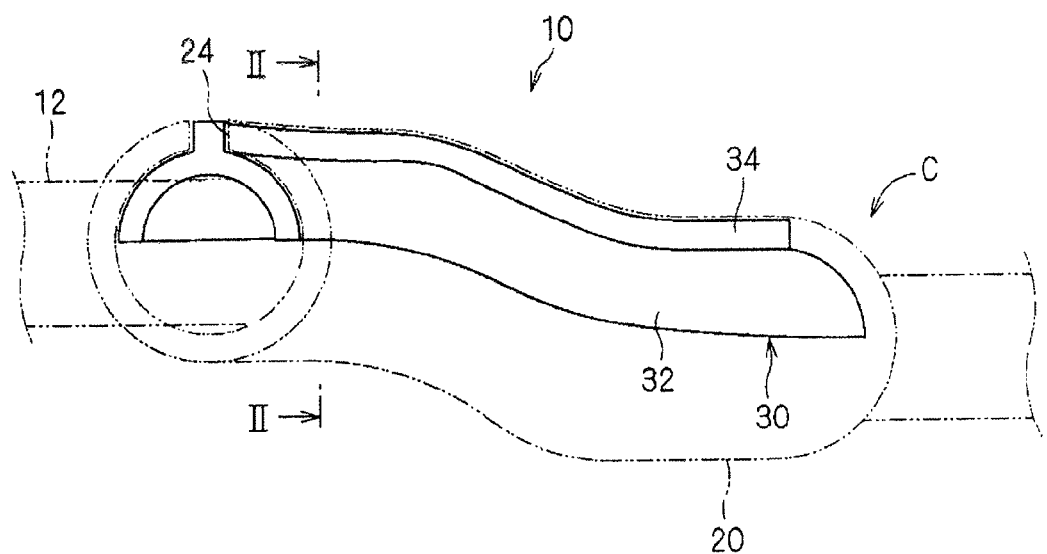
FIG. 1 is a schematic perspective view of a portion of a wire harness according to an embodiment where a corrugated tube is installed.
Figure 2:
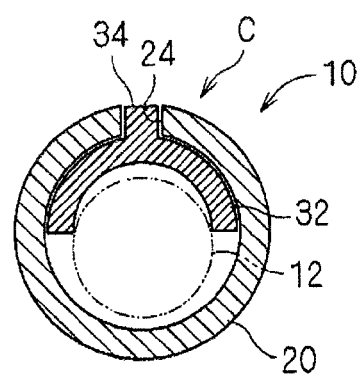
FIG. 2 is a schematic cross-sectional view along a line II-II of FIG. 1.
Figure 3:
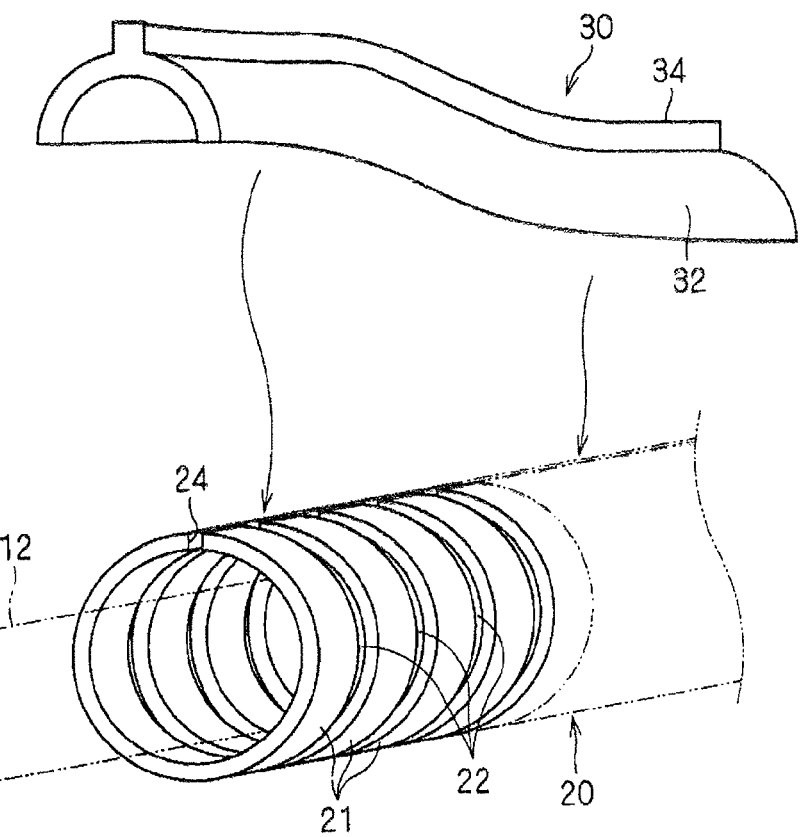
FIG. 3 is an explanatory diagram illustrating a process of attaching a path-maintaining member to the corrugated tube.

In the following, a wire harness and a corrugated tube with a path-maintaining member according to an embodiment are described. FIG. 1 is a schematic perspective view of a portion of a wire harness 10 where a corrugated tube 20 is installed. FIG. 2 is a schematic cross-sectional view along a line II-II of FIG. 1. FIG. 3 is an explanatory diagram illustrating a process of attaching a path-maintaining member 30 to the corrugated tube 20.

The wire harness 10 includes a wire harness main body 12, a corrugated tube 20 and a path-maintaining member 30.

The wire harness main body 12 is formed as a configuration in which a plurality of electric wires are bound together. More specifically, the wire harness main body 12 is formed as a configuration in which a plurality of electric wires are bound together while being separated into branches according to a wiring format of a vehicle to which the wire harness is to be installed. It is not necessary that the wire harness main body 12 always have branches. Further, the wire harness main body 12 may also be configured by a single electric wire. Further, other optical cables and the like may also be bound together in the wire harness main body 12.

When the wire harness main body 12 is installed in a vehicle or the like, the wire harness main body 12 is bent along the wiring format of the vehicle or the like. In order to inhibit interference with peripheral parts and the like by the wire harness main body 12, the wire harness main body 12 may be maintained in a shape bent to follow the wiring format. In this case, the present corrugated tube with the path-maintaining member C is installed on the wire harness main body 12, and the wire harness main body 12 is maintained in a constant bent shape. With respect to the wire harness main body 12, the portion where the present corrugated tube with the path-maintaining member C is installed may be at least a part of the wire harness main body 12, and may be either a part of the wire harness main body 12 or almost the entire wire harness main body 12.

The corrugated tube 20 is a tubular member that has annular convex portions 21 and annular concave portions 22 alternately formed along the longitudinal direction (see FIG. 3), and is formed of a resin and the like. Such a corrugated tube 20 is easily elastically deformable due to stepped portions between the annular convex portions 21 and the annular concave portions 22, and thus the corrugated tube 20 itself as a whole has a property of being easily bent and deformed. Usually, the corrugated tube 20 has an inner diameter larger (usually slightly larger) than an outer diameter of the portion of the wire harness main body 12 where installation is to occur.

Further, a slit 24 is formed on one side of the corrugated tube 20 along the longitudinal direction. By opening up at the slit 24, the wire harness main body 12 can be easily arranged inside the corrugated tube 20.

The path-maintaining member 30 is a long member die-molded to maintain a shape at least a portion of which is bent in the longitudinal direction, and is formed of a resin such as P.P. (polypropylene). In other words, during die-molding, the path-maintaining member 30 is formed into a shape at least a portion of which is bent. The bent shape of the path-maintaining member 30 is configured into a shape corresponding to a wiring path where a portion of the wire harness main body 12 is wired, the portion being a portion where installation is to occur. In an example illustrated in FIG. 1, a longitudinal-direction middle portion of the path-maintaining member 30 is bent into a gentle S shape, and two end portions of the path-maintaining member 30 are formed in linear shapes. The portion of the path-maintaining member 30 that is formed into a bent shape may be the entire path-maintaining member 30 or a part of the path-maintaining member 30. Further, the portion that is formed into a bent shape may be formed into a shape bent in a plane or into a cubically (three-dimensionally) bent shape.

The path-maintaining member 30 has an arc-shaped portion 32 in which a lateral cross-sectional shape in a direction orthogonal to a longitudinal direction thereof exhibits an arc shape. In the present embodiment, an example is described in which the entire path-maintaining member 30 in the longitudinal direction has the arc-shaped portion 32. However, it is also possible that a portion of the path-maintaining member 30 in the longitudinal direction has the arc-shaped portion 32. It is preferable that an inner diameter of the arc-shaped portion 32 be configured to be substantially the same as an outer diameter of the wire harness main body 12. As a result, the outer periphery of the wire harness main body 12 can be fitted inside the arc-shaped portion 32. Further, it is preferable that an outer diameter of the arc-shaped portion 32 be configured to be substantially the same as the inner diameter of the corrugated tube 20. As a result, the path-maintaining member 30 can be attached to the corrugated tube 20 in a state where an outer periphery surface of the arc-shaped portion 32 is stably in contact with an inner periphery surface of the corrugated tube 20. The arc-shaped portion 32 may have a uniform or non-uniform thickness in any one of the longitudinal direction and a circumferential direction.

Further, the path-maintaining member 30 has, on at least a portion of the arc-shaped portion 32 in the longitudinal direction, a protruding portion 34 that is provided in a protruding manner in a width-direction middle portion on an outer periphery side of the arc-shaped portion 32. Here, the protruding portion 34 forms a protruding bar portion that is formed along the longitudinal direction at a width-direction center part on the outer periphery side of the arc-shaped portion 32. It is preferable that a projection size of the protruding portion 34 be about the same as or less than (more preferably, slightly less than) a thickness dimension of the corrugated tube 20 (more specifically, a difference between an outermost peripheral portion of the annular convex portions 21 and an innermost peripheral portion of the annular concave portions 22 in a radial direction of the corrugated tube 20). However, the projection size of the protruding portion 34 may also be larger than the thickness dimension of the corrugated tube 20.

The path-maintaining member 30 itself does not have a portion installed on an outer periphery side of the corrugated tube 20. However, protruding portions protruding to an extent capable of positioning two side edges of the slit 24 of the corrugated tube 20 may be formed on side surfaces and the like of the protruding portion 34.

The protruding portion 34 may also be provided at a position deviated toward one side from the width-direction center part on the outer periphery side of the arc-shaped portion 32. Further, the protruding portion 34 may also be partially provided along the longitudinal direction of the arc-shaped portion 32. Further, the protruding portion 34 is not necessarily formed as one protruding bar, but may also be configured by a plurality of protruding bars (for example, two protruding bars formed in parallel). As a result, each of the protruding bars can be reduced in size (thinned) and resin shrinkage and the like can be inhibited. Further, the path-maintaining member 30 is not required to have the protruding portion 34.

The path-maintaining member 30 is attached to the corrugated tube 20 along the longitudinal direction in a state where the arc-shaped portion 32 is arranged on an inner periphery side of the corrugated tube 20.

That is, by opening the corrugated tube 20 at the slit 24, the wire harness main body 12 is housed inside the corrugated tube 20.

After this, the corrugated tube 20 is opened at the slit 24, and the path-maintaining member 30 is housed inside the corrugated tube 20. In this case, the wire harness main body 12 is fitted into an inner periphery side of the arc-shaped portion 32 of the path-maintaining member 30. Next, the protruding portion 34 is arranged in the slit 24 and the arc-shaped portion 32 is arranged on an inner side of the slit 24 between the inner periphery surface of the corrugated tube 20 and the outer periphery surface of the wire harness main body 12. As a result, the corrugated tube 20 is integrated with the path-maintaining member 30 in a state bent to follow the shape of the path-maintaining member 30.

It is also possible to simultaneously house the wire harness main body 12 and the path-maintaining member 30 in the corrugated tube 20 in a state where the path-maintaining member 30 is temporarily attached to the wire harness main body 12 or the like.

After this, when necessary, a tie band, an adhesive tape or the like is wound on the outer periphery of the corrugated tube 20 so that a closed state of the corrugated tube 20 is maintained and an integrated state of the corrugated tube 20 and the path-maintaining member 30 is maintained. A winding configuration of the adhesive tape may be a so-called rough winding and may also be a so-called tight winding. Further, the adhesive tape may be wound on the entire path-maintaining member 30 in the longitudinal direction and may also be partially wound. In addition to the above, the closed state of the corrugated tube 20 may also be maintained by a lock mechanism or the like provided on the corrugated tube 20 itself.

According to the corrugated tube with the path-maintaining member C and the wire harness 10 that are configured as described above, the path-maintaining member 30 is attached to the corrugated tube 20 along the longitudinal direction thereof in the state where the arc-shaped portion 32 is arranged on the inner periphery side of the corrugated tube 20. Therefore, it is possible, with a more compact configuration, to keep the path of the wire harness main body 12 constant while covering the wire harness main body 12.

In particular, in a case where the wire harness main body 12 and the corrugated tube 20 have large diameters, in order to maintain the wire harness main body 12 and the corrugated tube 20 in a predetermined bent shape, it is necessary to ensure that a path-maintaining member has a certain degree of strength. Here, for example, a case is assumed where a configuration is adopted in which a pair of concave grooves are formed on the path-maintaining member and edge portions on both sides of a slit of the corrugated tube are fitted into the pair of concave grooves. In this case, it is necessary to form a portion of the path-maintaining member that is arranged on the inner periphery side of the corrugated tube while a portion of the path-maintaining member that covers the outer periphery side of the corrugated tube is enlarged to conform with the shape of the corrugated tube. Therefore, a configuration of a mold for manufacturing the path-maintaining member becomes complicated and manufacturing cost increases. Further, it is necessary to also form a hole for mold releasing on the path-maintaining member itself at an appropriate position. Therefore, a required degree of strength is difficult to achieve relative to an amount of resin used. In addition, when attempting to maintain a complicated three-dimensional shape using the path-maintaining member, the problem as described above becomes pronounced.

In contrast, in the above embodiment, it is sufficient to increase primarily at least one of the thickness and the width of the arc-shaped portion 32. Therefore, a configuration of a mold for manufacturing the same can be relatively simplified. Further, a necessity of also forming a hole for mold releasing on the path-maintaining member 30 itself is low. Therefore, a sufficient degree of strength can be readily achieved.

In addition, the arc-shaped portion 32 maintains a bent shape of the wire harness main body 12 in the state where the arc-shaped portion 32 is installed on the outer periphery of the wire harness main body 12. Therefore, the wire harness main body 12 can be better maintained in a desired shape.

Further, the arc-shaped portion 32 is arranged on the inner periphery side of the corrugated tube 20. Therefore, a situation can be inhibited in which the wire harness main body 12 inside the corrugated tube 20 may escape to an exterior through the slit 24.

In particular, the protruding portion 34 is arranged in the slit 24. Therefore, the arc-shaped portion 32 of the path-maintaining member 30 can be positioned to be arranged on the inner side of the slit 24 and the situation in which the wire harness main body 12 inside the corrugated tube 20 may escape to the exterior through the slit 24 can be more reliably inhibited.

Further, the path-maintaining member 30 can be installed on the corrugated tube 20 by arranging the arc-shaped portion 32 inside the corrugated tube 20 and by arranging the protruding portion 34 in the slit 24 as needed. Therefore, installation workability is superior.

The dimension of the arc-shaped portion in the width direction may differ in one path-maintaining member.

Figure 4:
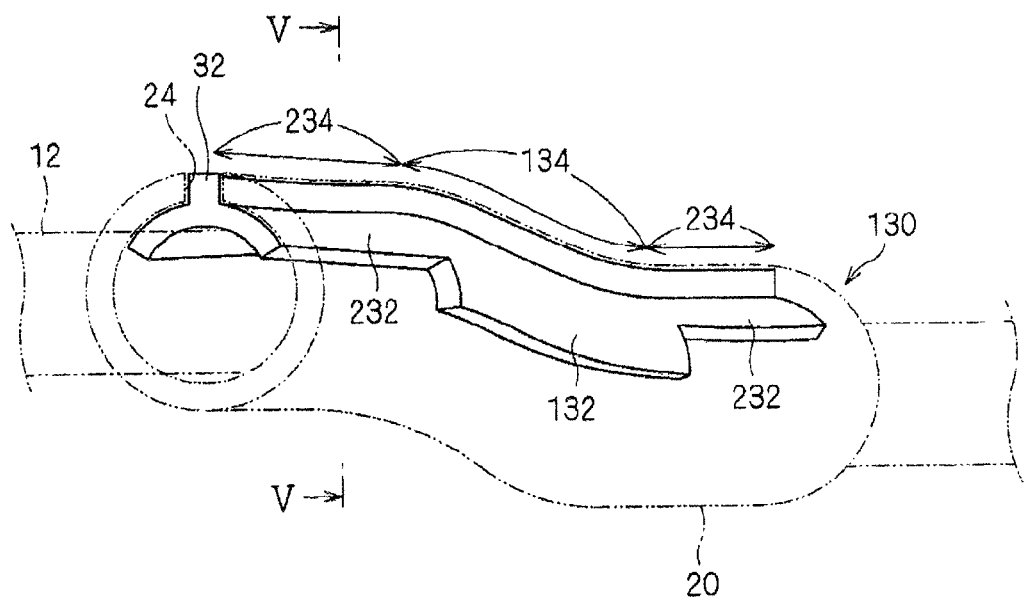
FIG. 4 is a schematic perspective view of a modified example of a path-maintaining member.
Figure 5:
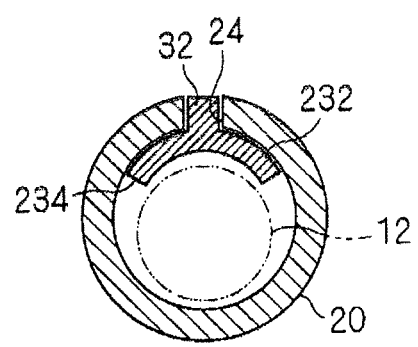
FIG. 5 is a schematic cross-sectional view along a line V-V of FIG. 4.

FIG. 4 is a schematic perspective view of a path-maintaining member 130 according to a modified example and FIG. 5 is a schematic cross-sectional view along a line V-V of FIG. 4. A schematic cross-sectional view of a first portion 134 in FIG. 4 is the same as FIG. 2.

In this case, the path-maintaining member 130 according to the modified example as illustrated in FIG. 4 includes the first portion 134 and a second portion 234 where arc-shaped portions 132 and 232 that correspond to the above arc-shaped portion 32 have different length dimensions. The first portion 134 that has a long dimension in a width direction of the arc-shaped portion 132 is more sharply bent than the second portion 234 where the arc-shaped portion 232 has a short length dimension. Here, the first portion 134 being more sharply bent than the second portion 234 includes a case where a bending radius of the first portion 134 is smaller than a bending radius of the second portion 234 and a case where the first portion 134 is bent whereas the second portion 234 is in a linear shape. Here, the second portion 234 linearly extends on two longitudinal-direction end portions of the path-maintaining member 130 and the first portion 134 is bent into a gentle S shape at a longitudinal-direction middle portion of the path-maintaining member 130.

The dimension of the first portion 134 in the width direction of the arc-shaped portion 132 (here, a dimension in a circumferential direction thereof) is configured to be larger than the dimension of the second portion 234 in the width direction of the arc-shaped portion 232 (here, a dimension in a circumferential direction thereof). Therefore, the first portion 134 has a higher rigidity than the second portion 234.

According to the modified example, the first portion 134 where the path-maintaining member 130 is relatively sharply bent (that is, the first portion 134 that maintains the wire harness main body 12 and the corrugated tube 20 in a relatively sharply bent state) has a relatively high rigidity. Therefore, the wire harness main body 12 and the corrugated tube 20 can be more reliably maintained in a relatively sharply bent state. Further, in the second portion 234 where the path-maintaining member 130 is relatively not sharply bent, the dimension of the arc-shaped portion 232 in the width direction can be reduced and the size thereof made smaller. As a result, a three-dimensional shape can be easily die-molded and the amount of resin used can be reduced.

In the above, the present invention is described in detail. However, the above description is in all aspects for exemplary purposes and the present invention is not limited by the description. It is understood that numerous modified examples that are not exemplified can be envisioned without departing from the scope of the present invention.

The invention claimed is:

1. A corrugated tube with a path-maintaining member comprising:
   a corrugated tube having annular convex portions and annular concave portions alternately formed along a longitudinal direction; and
   a path-maintaining member configured as an elongated member die-molded to maintain a shape at least a portion of which is bent along the longitudinal direction, that includes an arc-shaped portion in which a lateral-direction cross section has an arc shape, and that is attached to the corrugated tube along the longitudinal direction in a condition where the arc-shaped portion is arranged on an inner periphery side of the corrugated tube, wherein
   the path-maintaining member includes a first portion and a second portion having different dimensions in a width direction of the arc-shaped portion, and the first portion has a longer dimension in the width direction of the arc-shaped portion, and is more sharply bent, than the second portion that has a shorter dimension in the width direction of the arc-shaped portion, and
   wherein an outer surface of the first portion and an outer surface of the second portion are formed continuously with each other such that the first portion and the second portion do not overlap with each other in the longitudinal direction.

2. The corrugated tube with the path-maintaining member according to claim 1, wherein
   the path-maintaining member includes, on at least a portion of the arc-shaped portion in the longitudinal direction, a protruding portion protruding in a width-direction middle portion on an outer periphery side of the arc-shaped portion, and
   the protruding portion is arranged in a slit formed in the corrugated tube.

3. A wire harness assembly comprising:
   the corrugated tube with the path-maintaining member according to claim 1; and
   a wire harness main body having at least one electric wire and which is inserted into the corrugated tube with the path-maintaining member.

4. A wire harness assembly comprising:
   the corrugated tube with the path-maintaining member according to claim 2; and
   a wire harness main body having at least one electric wire and which is inserted into the corrugated tube with the path-maintaining member.

* * * * *